United States Patent [19]

Cannady, Jr. et al.

[11] Patent Number: 4,726,986
[45] Date of Patent: Feb. 23, 1988

[54] DECORATIVE LAMINATES HAVING A THICK CHEMICAL RESISTANT OUTER LAYER

[75] Inventors: Daniel L. Cannady, Jr., Allendale; Lenon G. Brooker, Hampton, both of S.C.

[73] Assignee: Westinghouse Electric Corp., Pittsburgh, Pa.

[21] Appl. No.: 908,419

[22] Filed: Sep. 17, 1986

[51] Int. Cl.$^4$ ............................ B32B 3/26; B32B 5/14
[52] U.S. Cl. ..................................... 428/278; 428/283; 428/313.3; 428/308.4; 427/39; 427/198; 427/278
[58] Field of Search .................. 428/278, 283, 313.3, 428/308.4; 427/198, 278, 391

[56] References Cited

U.S. PATENT DOCUMENTS

| | | |
|---|---|---|
| 3,908,059 | 9/1975 | Prince . |
| 4,046,937 | 9/1977 | McCaskey, Jr. et al. ....... 428/278 X |
| 4,250,136 | 2/1981 | Rex ................................. 428/313.3 X |
| 4,362,778 | 12/1982 | Andersson et al. . |
| 4,510,201 | 4/1985 | Takeuchi et al. ............ 428/313.3 X |
| 4,543,290 | 9/1985 | Brooker et al. . |
| 4,578,297 | 3/1986 | Duncan ........................ 428/313.3 X |

FOREIGN PATENT DOCUMENTS 2496739  6/1982  France ............................ 428/313.3

Primary Examiner—George F. Lesmes
Assistant Examiner—D. R. Zirker
Attorney, Agent, or Firm—D. P. Cillo

[57] ABSTRACT

A resin impregnated and resin coated has a decorative portion coated at least 1 mil thick with a vinyl ester terminated bisphenol A epoxy resin matrix, containing hollow plastic microspheres through its thickness.

12 Claims, 1 Drawing Figure

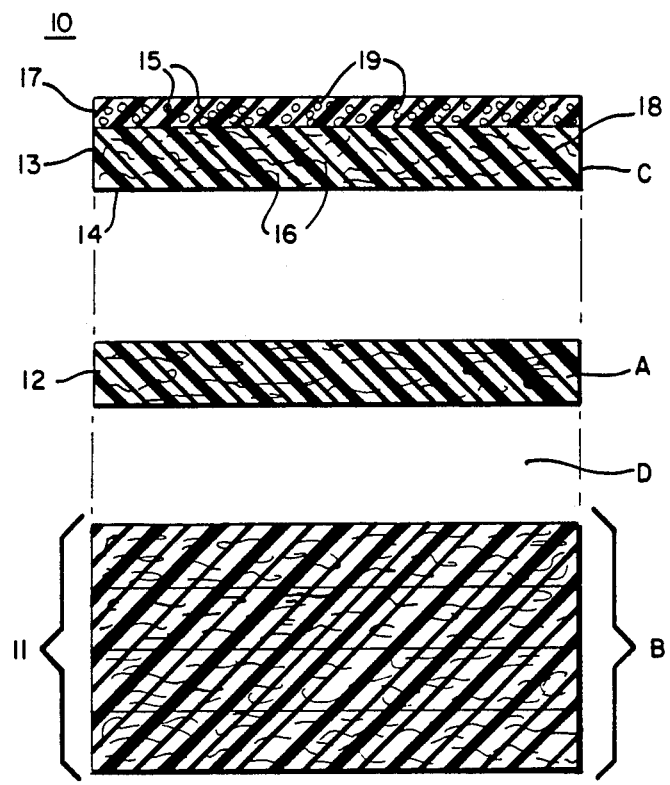

DECORATIVE LAMINATES HAVING A THICK CHEMICAL RESISTANT OUTER LAYER

BACKGROUND OF THE INVENTION

Decorative laminate sheeting is commonly used as the surface material for a wide variety of residential and commercial uses. For example, Andersson et al., in U.S. Pat. No. 4,362,778, taught foam laminates containing thermoplastic microspheres, usable as pin-attachable notice boards; Prince, in U.S. Pat. No. 3,908,059, taught decorative ceiling tile sheeting, having a core, and a patterned layer of expanded plastic particles; and Brooker et al., in U.S. Pat. No. 4,543,290, taught chemical resistant, high pressure laminate sheeting having a consolidated bottom core, melamine impregnated decorative sheet and top surface coating of vinyl ester terminated bisphenol A epoxy resin.

The Booker et al. laminate helped solve a major deficiency in decorative laminates, i.e., resistance to strong chemicals such as acids, bases, oxidizing agents, and solvents, and allowed use of decorative laminates in industrial laboratories and in hospital environments. The main requirement of chemical resistant decorative laminates is that the laminates have a thick layer of chemical resistant resin on the surface. In order to retain a thick layer of resin on the surface of laminates molded at about 1000 psi., it is essential that the surface have a low degree of flow during the molding process. Low flow in top coating resins can, however, cause mottling, resin streaks, and voids in finished laminates. Air can also be trapped in top thick resin layers, causing pits and other surface defects.

Brooker et al. used a 400 cps. to 800 cps. viscosity epoxy resin as a surface coating, and taught a wide variety of optional thixotroping agent additives, such as fumed silica, to help control flow properties of their top epoxy surface coating. However, even small amounts of such additives, when used, were noticeable at the laminate surfaces, especially at the surface of black colored laminates, and detracted from overall appearance of the laminate. What is needed is a more flow controllable surface resin for chemical resistant laminates. The surface resin should allow a thicker final coating after high pressure lamination without impairment of surface appearance, and the ability to resist highly corrosive chemicals.

SUMMARY OF THE INVENTION

The above need has been met and the above problem solved by coating a decorative laminate, comprising a resin impregnated, bottom core portion, and a resin impregnated decorative substrate portion on top of the core, with a top resinous coating of about 1 mil to 6 mil thick (0.001 inch to 0.006 inch) vinyl ester terminated bisphenol A epoxy resin containing from about 0.5 wt.% to about 10 wt.%, based on total resin solids, of elastic, hollow plastic microspheres. These microspheres generally contain a gas or a liquid blowing agent, are preferably from about 2 microns to about 40 microns diameter, are expandable, very light, resin wettable, and help support the top resin coating during molding. Preferred microspheres are polyvinylidine chloride type plastics which expand unhindered from about 50% to 300% on heating. During molding, the chemical resistant epoxy resin easily wets and adheres to the plastic microspheres, which microspheres expand, helping make up for some flow loss of resin and helping to support a thick layer of resin during heat and pressure laminating. While the plastic microspheres are not as chemically resistant as the epoxy resin matrix surrounding and attached to them, the extra thickness of resin resulting from their use provides an extremely corrosion resistant laminate.

In the method of making the coated substrate of this invention, about 0.5 wt.% to about 10 wt.% of expandable, hollow plastic microspheres are mixed into a vinyl ester terminated bisphenol A epoxy resin, to provide a homogeneous composition having the microspheres uniformly dispersed therethrough, the mixture having a viscosity of from about 850 cps. to about 3500 cps at 25° C. The composition is then applied as a 3 mil to 7 mil thick coating onto a decorative substrate layer and B-staged, i.e., dried but still capable of final cure. During B-staging, the microspheres will remain generally evenly distributed in the resinous matrix, and expand slightly.

The B-staged, coated decorative layer can then be placed on additional stack-up layers, such as a core layer, and the decorative layer and core layer are then laminated together. During this laminate molding, the coating resin will flow slightly, but the plastic microspheres will still remain trapped in and substantially uniformly distributed through the resin matrix, helping to support the resin during pressure molding. Because the plastic microspheres are clear, they will not be visible, so that, very importantly, a perfectly clear decorative pattern or color will be seen.

BRIEF DESCRIPTION OF THE DRAWING

For a better understanding of the invention, reference may be made to the preferred embodiments exemplary of the invention, shown in the accompanying drawing, which is a cross-sectional view of one embodiment of a chemical resistant decorative laminate stack-up showing the microsphere containing coating and resin impregnation in the top layer.

DESCRIPTION OF THE PREFERRED EMBODIMENTS

Referring now to the drawing, one embodiment of a decorative laminate stack-up 10 is shown, as it might be placed in a press to be heat and pressure consolidated. The stack-up comprises core 11, optional barrier layer 12 and resin treated decorative surface layer 13 having a cured coating layer 17 thereon, containing uniformly distributed hollow plastic microspheres 19. The decorative substrate portion includes everything but the core and barrier layer. The core 11 will generally contain from about 2 to 8 sheets of Kraft paper or the like, impregnated with a phenolic resin. These resins are conventionally obtained by reacting a phenolic substance such as phenol itself, substituted phenols, i.e., alkyl phenols such as cresols, xylenols, tertiary alkyl phenols, and the like, or mixtures of such phenolic substances with an aldehyde such as formaldehyde, acetaldehyde, propionaldehyde, benzaldehyde, furfural, and the like, or with mixtures of such aldehydes, either alone or in the presence of other aldehyde-reactable substances such as urea, thiourea, substituted ureas and thioureas, aminotriazines, and the like.

Optional barrier layer 12 will usually be a single sheet of Kraft paper or alpha-cellulose paper, impregnated with a resin compatible with both the phenolic resin in the core and the to-be-applied epoxy resin coating. The preferred impregnating resin for the barrier layer is an aminotriazine-aldehyde resin, usually a melamine-formaldehyde resin. Other useful resins include acrylics, urethanes, and the like. The top decorative surface sheet 13 will be a single sheet of alpha-cellulose paper which can be treated with an impregnating resin 18 such as an aminotriazine-aldehyde resin, or a low viscosity, i.e., about 25 cps. to 350 cps. at 25° C., version of the vinyl ester terminated bisphenol A epoxy resin described layer on in the specification. A high viscosity, protective, top vinyl ester terminated bisphenol A epoxy resin is shown as 15. The protective resin 15 can saturate somewhat into the print sheet 13 via the alpha-cellulose paper fibers shown as 16. The high viscosity vinyl ester terminated bisphenol A epoxy resin 15 will contain hollow plastic microspheres 19. The resin 15 forms a clear, uniform, continuous, non-fibrous, non-porous, non-patterned coating layer 17 on the entire top surface of the decorative sheet 13, as shown in the drawing, with the plastic microspheres 19 being uniformly distributed from top to bottom in the surrounding, firmly attached epoxy matrix. The decorative sheet in this embodiment will usually have a solid color caused by dying or pigmenting the sheet.

As can be seen, in the optional embodiment described above, the top decorative sheet has its aminotriazine-resin impregnated surface 14 facing the phenolic resin of the core. In some instances, when an aminotriazine-aldehyde impregnant is used, that thickness of aminotriazine-aldehyde resin is enough of a barrier between the phenolic and the high viscosity vinyl ester terminated epoxy surface coating to prevent cure inhibition of the epoxy by the phenolic resin, thus allowing elimination of the separate barrier layer 12. Another embodiment, can eliminate melamine impregnation into the print sheet 13 and utilize only the vinyl ester terminated bisphenol A epoxy as both high viscosity coating resin and low viscosity impregnating resin, relying solely on a suitable resin, preferably melamine in barrier layer 12 to prevent phenolic contact.

The preferred aminotriazine-aldehyde resins which can be used to impregnate the print and barrier sheets are well known in the art. Melamine is the preferred aminotriazine reactant for preparing the aminotriazine-aldehyde, but other aminotriazines, i.e., mono-, di-, and tri-substituted melamines, such as the mono-, di-, and tri-methylmelamines, and the like; guanamines, as well as mixtures of aminotriazines, may also be utilized as reactants. Similarly, formaldehyde, either as such or as an aqueous solution, is the preferred aldehyde reactant, but other aldehydes, i.e., acetaldehyde, propionaldehyde, butyraldehyde, and the like may also be employed.

The barrier sheet, if used, and the core sheets are impregnated using standard techniques. The barrier sheet will be impregnated with a solution of resin to give a resin content of at least about 30 weight percent, preferably between 45 percent and 75 percent by weight, based on the total dry weight of the impregnated sheet, and then dried to a stage where the volatile content is from about 2 wt.% to 10 wt.%. If used, the barrier sheet should have at least about 30 weight percent resin so that the barrier resin can effectively act to prevent phenolic resin flow to the top of the laminate during high pressure consolidation. If phenolic resin in core 11 is allowed to contact the vinyl ester terminated bisphenol A epoxy resin, the epoxy resin may inhibit top surface cure to the "C"-stage, i.e., to the completely infusible and cured stage, and possibly allow degradation of the decorative print layer 13 by strong chemicals.

The core layer sheets are impregnated with a solution of phenolic resin to give a resin content between 20 percent and 40 percent by weight, based on the total dry weight of the impregnated sheet, and then dried to a stage at which the resin is only partly cured and has a volatile content between about 4 wt.% to 15 wt.%. All of such dried or partially cured resins in the sheets are in the "B"-stage, i.e., dry to the touch but flowable under heat and pressure during the heat and pressure lamination procedure, and capable of final cure.

Again referring to the Drawing, the decorative sheet 13 can have a dual resin treatment achieved by first impregnating the print alpha cellulose with a resin such as an aminotriazine-aldehyde impregnating resin solution, having a viscosity of between about 25 cps. and 350 cps. at 25° C., by a dip and squeeze process, followed by immediately metering a solution of hollow plastic microsphere containing vinyl ester terminated bisphenol A epoxy resin, having a viscosity of between about 850 cps. and about 3500 cps. at 25° C., onto the wet impregnating resin. Then the dual treated sheet is heated in a forced air oven to "B"-stage the resins, driving off volatiles. The vinyl ester terminated bisphenol A epoxy can penetrate up to about $\frac{1}{8}$ of the thickness of the print sheet, as shown at point 18, traveling along the fibers 16, filling any voids present and mixing to some degree with the aminotriazine-aldehyde resin.

Standard decorative sheets are about 8 mil thick (0.008″) and, in this process, the microsphere containing vinyl ester terminated epoxy will seep into the top of the print sheet, mingling with the other resin, possibly to a depth of about $\frac{1}{2}$ mil, with maximum impregnation of about 1 mil; additionally, a surface coating 17, at least about 1 mil and preferably about 3 mil to 6 mil thick will be formed.

In the low cost method, the low viscosity version of the vinyl ester terminated bisphenol A epoxy resin will simply be coated onto the decorative surface sheet 13, whereupon the resin will impregnate the decorative sheet to a depth of about 6 to 8 mils, i.e., substantially through the sheet with little surface coating remaining. Then the impregnated print sheet can be B-staged and, when cooled, coated with the hollow plastic microsphere containing high viscosity version of the vinyl ester terminated bisphenol A epoxy resin. Any voids at the bottom of decorative sheet 13 will be filled by melamine resin from barrier sheet 12 during lamination.

Additionally, in another embodiment of the invention, where the decorative sheet is not a solid color but is a pattern, such as a wood grain or marble pattern, an aminotriazine-aldehyde impregnated alpha-cellulose decorative print sheet can, referring to the Drawing, be disposed at position A, over phenolic impregnated core B, and below a resin treated protective overlay sheet C. In this case, the pattern is printed on the print surface and is more susceptible to wear than a solid colored print sheet having pigment throughout its cross section, and must be protected by an overlay layer.

The overlay C, described previously, will be made the same way as covered layer 13 described previously, except that no pattern, dye or pigment will be used in the sheet. In the instance of a patterned laminate comprising impregnated protective overlay C, melamine impregnated print A, and phenolic impregnated core B, as in the situation described previously, a Kraft paper or alpha-cellulose paper sheet impregnated by an aminotriazine-aldehyde resin can be used as a barrier layer at point D, such layer not shown in the Drawing.

The vinyl ester terminated diglycidyl ether of bisphenol A based epoxy resin used as the coating and optionally as the impregnating resin in this invention has the general structural formula:

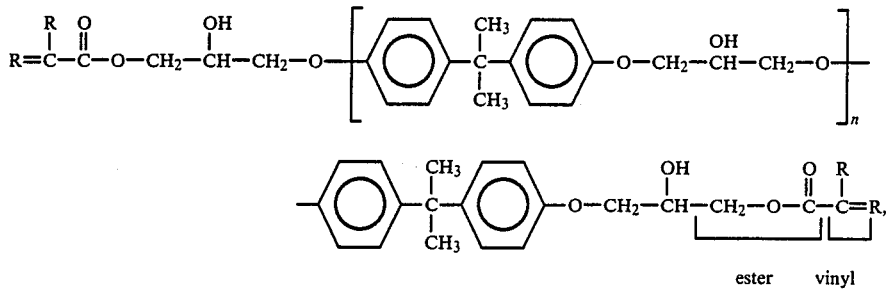

where each R can individually be alkyl from 1 carbon to 6 carbons, n is from about 1 to about 3, and the bottom chain is attached to the top chain. Most preferably, R will be $CH_2$ or $CH_3$, and the resin will have the general structural formula:

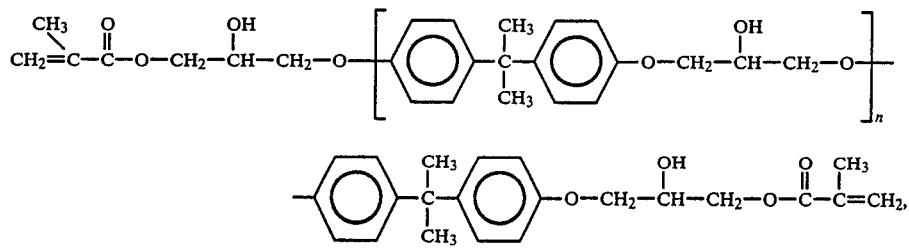

where n is from about 1 to about 3. These materials are commercially available, usually in styrene solution.

When this resin is to be used as an impregnant for the decorative sheet, a suitable solvent, such as acetone, or the like, can be added to reduce viscosity to from about 25 cps. to about 350 cps. at 25° C. When the epoxy resin is to be used as a coating composition containing the hollow plastic microspheres, it is essential that the viscosity of the vinyl ester terminated epoxy with included microspheres be over about 850 cps, preferably in the range from about 850 cps. to about 3500 cps. at 25° C., corresponding to a styrene solvent content of about 30% to 40% by weight; otherwise layer 17 in the Drawing will not continuously form to a thickness of from 1 mil to 6 mils and the fibers in the top surface will not be completely protected from contacting harsh chemicals. The resin is generally applied in the range of about 10 grams to about 25 grams per square foot of top laminate surface.

The hollow plastic microspheres, shown as 19 in the drawing, preferably have a diameter of from about 2 microns to about 40 microns, preferably 4 microns to 20 microns, are very light, about 1.15 gr./ml. unexpanded, and about 0.032 gr/ml. expanded, are resin wettable, so that they will not float on top of the resin, and generally contain air or a volatile, liquid blowing agent which is vaporized on application of heat, such as freons, n-pentane, neopentane butane, and the like, inside. Under 2 microns, little support for the resin will be provided, over 40 microns, the surface of the laminate may start to show some roughness. The plastic shell of the microspheres is preferably a thermoplastic, vinylidene chloride terepolymer. Vinylidene chloride-acrylonitrile, vinyl chloride-acrylonitrile, styrene-acrylonitrile, and vinyl chloride-vinylidene chloride microspheres, among others, have been found to be useful. All of these thermoplastics contain the $$-\underset{|}{C}=\underset{|}{C}- \text{ group}$$

or moiety.

The elastic microsphere shell or walls begin to soften at about 105° C. to 115° C. They will expand from about 50% to 300% upon heating over about 115° C. when unhindered. In this invention, since they are mixed into a thick resin matrix, expansion will be hindered and limited to an additional 50% to 100% of their original size, i.e. up to a maximum of about 40+40 (1.00)=80 microns (0.0031 inch), which may be useful for 5 mil to 6 mil final coatings. Hollow glass microspheres are specifically excluded since the resin does not wet them so they will not stay in homogeneous admixture with the epoxy, and they break easily. Solid glass or solid plastic beads are excluded because glass would not wet well and both types would be relatively heavy and settle to the bottom.

About 0.5 wt.% to about 10 wt.%, preferably, 1 wt.% to 5 wt.%, based on total resin solids, of the elastic microspheres are added and mixed into the vinyl ester terminated bisphenol A epoxy chemical resistant coating resin until a homogeneous resinous composition having a viscosity of from about 850 cps. to about 3500 cps. at 25° C. results. This composition is then coated to a thickness of from about 3 mil to 7 mil onto a decorative substrate layer. The composition can impregnate the decorative substrate to a minor extent, but in all cases must remain as a uniform, continuous, non-fibrous, non-porous coating on top of the decorative substrate. The coated decorative substrate is then B-staged at from about 120° C. to about 150° C. for 3 minutes to 5 minutes. During B-staging, the microspheres will remain generally evenly distributed in the resinous matrix due to their lightness and the viscosity of the resin and will expand slightly to an additional 30% to 50% of their original diameter.

The B-staged, coated decorative layer will then be placed on additional stack-up layers, such as a core layer, and the decorative layer and core layer laminated together at from about 135° C. to about 150° C. and from about 750 psi to about 1500 psi to cure the resin and consolidate the laminate. During this laminate molding, the coating resin will flow slightly and the elastic microspheres may further expand to an additional 50% to about 100% of their original diameter still remaining trapped in the resin matrix, helping to support the resin during pressure molding. After expansion, the microspheres will constitute from about 1.5 volume % to about 20 volume % of the cured coating. Due to their thin walled structure, minor shell breakage may occur and is allowable. Since the resin adheres to and wets the hollow plastic microspheres, surface resin flow will be lessened, and the final coating will be from about 1 mil to 6 mil, preferably from about 3 mil to 6 mil, thick. Because the microspheres are clear, they will not be visible, so that a perfectly clear pattern or color will be seen. This is an important consideration to the customer.

Thixotroping agents, such as submicroscopic fumed silica, are not needed nor desirable, and in fact can produce surface imperfections which may be considered undesirable, especially on some colors of laminate decorative sheet. Suitable catalysts for the vinyl ester terminated epoxy resin, such as various peroxides, naphthenates and the like, can be used in effective amounts, usually in the range of from about 0.5 wt.% to about 2 wt.% based on the weight of vinyl ester terminated epoxy resin solids.

Also, small effective amounts of wetting and release agents, well known in the laminating art, may be used in the coating composition. Although low pressure laminating techniques can be used with the previously described stack-ups, high pressure techniques are most suitable to insure chemical resistance. Temperatures ranging from about 135° C. to about 150° C., and pressures ranging from about 750 psi to 1,500 psi. can be employed. The time required, at these temperatures, to effect a cure of the resinous components of the assembly will usually be from about 3 minutes to about 25 minutes. The resulting laminate is generally allowed to cool to between about 50° C. to 85° C. before being removed from the press. The cooling step generally takes between about 30 minutes to 90 minutes. Generally, the assembly will require a 15 minute to 45 minute warm-up period before the 135° C. to 150° C. maximum curing temperatures are reached in the press. The entire cycle of warm-up, cure and cooling will vary between about 50 minutes to 160 minutes. Release sheets, such as nonadherable aluminum foil, coated paper, plastic film, and the like can be used between the laminate lay-up and the press surface.

EXAMPLE 1

Kraft paper core stock was impregnated with a standard phenol-formaldehyde resin solution by a continuous dip and squeeze process, dried to the "B"-stage in a forced air oven at about 110° C., and then cut into 12 inch by 12 inch sections. High quality alpha-cellulose paper stock was impregnated with a standard melamine-formaldehyde resin solution by a continuous dip and squeeze process, to give a resin content of about 62 weight percent, i.e., a treated ratio of 2.7, dried to the "B"-stage in a forced air oven at about 110° C., and then cut into 12 inch by 12 inch sections, for use as barrier sheets.

Two epoxy resin compositions A and B were then prepared: 12,272 grams (27.0 lbs) of vinyl ester terminated diglycidyl ether of bisphenol A epoxy resin in a 35 weight percent styrene solution, i.e., 65 wt.% solids or 7,977 grams, having a viscosity at 25° C. of from about 1500 cps to 3500 cps at 25° C. (sold commercially by Interplastic Corporation under the trade name VEX 107-275 B Epoxy); 122.6 grams of benzoyl peroxide catalyst; 61.3 grams of wetting agent containing a solvent solution of unsaturated polyamines, amides and high molecular weight acid esters; 24.5 grams of alkyl orthophosphate ester mold release agent; and 3,682 grams (8.1 lbs) of acetone solvent were admixed, to provide an impregnating composition having a viscosity of from 25 cps to 100 cps at 25° C.—Resin A.

Resin B—the thick coating resin was also prepared—to 5,000 grams (11.0 lbs) of vinyl ester terminated diglycidyl ether bisphenol A epoxy resin in a 35 weight percent styrene solution, i.e., 65 wt.% solids or 3,250 grams, the same VEX 107-275 B Epoxy used in Resin A, was added 49.9 grams of 5 micron to 15 micron polyvinylidene chloride terpolymer, hollow, plastic, expandable, gas containing microspheres, having a density of 1.15 gm/ml. unexpanded, 49.9 grams of benzoyl peroxide catalyst, 24.9 grams of wetting agent containing a solvent solution of unsaturated polyamines, amides and high molecular weight acid esters, 49.9 grams of arcylate air release agent; and 9.9 grams of alkyl orthophosphate ester mold release agent were thoroughly admixed, to provide a homogeneous, thick composition having a viscosity from 1500 cps to 3500 cps at 25° C., with 0.99 wt.% of hollow microspheres based on resin solids (49.9 gr/5,000 gr)-Resin B coating resin.

A web of decorative black overlay paper, 13 in the Drawing, about 8 mil thick, was treated with the low viscosity Resin A impregnating composition by a dip and squeeze process, and B-staged on a conventional pilot treater. The unheated black sheet weighed 5.1 gr/sq.ft, and the impregnated black sheet weighed 10.68 gr/sq.ft. The B-staged, impregnated web was then coated with the thick, homogeneous coating, Resin B, on one side only and B-staged again. The coated, impregnated black sheet weighed from 24.8 gr/sq.ft. to 25.2 gr/sq.ft, contained a surface coating of from about 4 mil to 5 mil thick and presumably penetrated at most ¼ mil to 1 mil of the impregnated sheet. The plastic microspheres appeared not to have settled and appeared to be still substantially uniformly distributed through the epoxy matrix. The flow content of the coating was 20.0% at 425 psi pressure. In both instances, the B-stage process involved a 40 foot drying oven with a temperature range of from about 108° C. to about 120° C. The coated, impregnated black sheet was then cut into 12 inch by 12 inch sections.

A laminate stack-up was then assembled containing in superimposed relationship a bottom; core layer of six sheets of B-staged phenolic impregnated Kraft paper, one middle B-staged melamine impregnated alpha cellulose barrier sheet, and one top, epoxy treated, 8 mil thick B-staged black colored decorative sheet, having an epoxy coating on the surface containing hollow plastic microspheres. About 7 mil of melamine resin-barrier sheet separated the phenolic resin in the core from the vinyl ester terminated epoxy resin in the print sheet. A velvet texture release sheet was used next to the press plates.

This stack-up was molded in a four board pack construction on a standard laminating press for 25 minutes at a platten setting of 150° C. and 1,000 psi hydraulic pressure. The press was cooled and the completely cured and consolidated laminates were removed. The laminates were 1/16 inch (0.15 cm) thick and maintained about a 3 mil coating on their surface. They were then tested for completion of cure, and for craze, impact, ultraviolet light resistance, and other physical properties by standard test procedures.

The laminates met all NEMA (National Electrical Manufacturers Association) requirements relating to wear resistance, scuff resistance, impact resistance, dimensional change, boiling water resistance, high temperature resistance, radiant heat resistance, conductive heat resistance, and light resistance. The laminates were additionally tested for chemical resistance by subjecting the surface of the laminates to various chemicals for 24 hours of continuous exposure. The results of the test were that the surfaces were not affected by 10% sodium hydroxide, 50% sodium hydroxide, 70% sulfuric acid, concentrated hydrochloric acid, concentrated phosphoric acid, glacial acetic acid, 90% formic acid, concentrated ammonium hydroxide, potassium permanganate, or acetone. There was a very slight surface effect with methyl Cellosolve, and the surface was moderately to severely affected by concentrated nitric acid. The majority of the above reagents would affect the surface of a normal decorative laminate to the point that it would not be suitable to be used in an environment where it would be exposed to any of the above-named chemicals for extended time periods.

As can be seen, excellent chemical resistance resulted, making these types of laminates excellent candidates for use in chemical laboratories and the like environments. The surface had good luster, was smooth, and showed a clear black color.

For comparison, the same laminate was made, using exactly the same materials, proportions and preparation, except, 0.99 wt.% fumed silica (sold by Cabot Corporation under the Tradename Cab-O-Sil) was substituted for the 0.99 wt.% hollow, plastic microspheres in the coating composition B. The resulting laminate containing no microspheres also had good wear, stuff, impact, boiling water and chemical resistance, and provided a 3 mil surface coating, however, the surface coating contained, clearly visible, what looked like tiny flecks or minute gas bubbles on the black surface. This would be even more obvious in other colored laminates if 5 wt.% to 10 wt.% fumed silica were used instead of only 1 wt.%, whereas the plastic microspheres would not be evident at 5 wt.% to 10 wt.% levels. Thus, even thicker, more corrosion resistant coatings could be made using about 5 wt.% plastic microspheres, with no deleterious effect to the customer visually, especially on other than white laminates.

We claim:

1. A resin impregnated and resin coated, chemical resistant laminate comprising a core, and a top decorative layer containing a decorative sheet having a top exterior coating thereon, at least 1 mil thick and covering the entire decorative layer, the coating comprising a vinyl ester terminated bisphenol A epoxy resin matrix, containing hollow, transparent, microspheres made from a thermoplastic selected from the group consisting of vinylidene chloride polymers, vinylidene chloride-acrylonitrile copolymers, vinyl chloride-acrylonitrile copolymers, styrene-acrylonitrile copolymers, and vinyl chloride-vinylidene chloride copolymers having a diameter of up to about 80 microns, said laminate being heat and pressure consolidated, where said microspheres are substantially uniformly distributed through and support the epoxy resin matrix, and are effective to help support the epoxy resin coating during consolidation.

2. The chemical resistant laminate of claim 1, where the core layer is impregnated with a phenolic resin, and an aminotriazine-aldehyde resin is disposed between the phenolic resin in the core and the epoxy resin coating.

3. The chemical resistant laminate of claim 1, where the decorative sheet is a solid colored sheet.

4. The chemical resistant laminate of claim 1, where the microsphere containing vinyl ester terminated bisphenol A epoxy resin is applied as a composition having a viscosity of from about 850 cps to about 3500 cps at 25° C.

5. The chemical resistant laminate of claim 1, where the epoxy coating is from about 2 mil to 6 mil thick, and the microspheres comprise from about 1.5 volume % to about 20 volume % of the exterior coating.

6. A method of making a coated decorative laminate comprising the steps:
 (1) admixing a vinyl ester terminated bisphenol A epoxy resin with about 0.5 weight percent to about 10 weight percent, based on epoxy resin solids, of hollow, transparent, microspheres made from a thermoplastic selected from the group consisting of vinylidene chloride polymers, vinylidene chloride-acrylonitrile copolymers, vinyl chloride-acrylonitrile copolymers, styrene-acrylonitrile copolymers, and vinyl chloride-vinylidene chloride copolymers and having a diameter of from about 2 microns to about 40 microns, to provide a homogeneous composition having a viscosity of from about 850 cps. to about 3500 cps. at 25° C.,
 (2) providing a decorative layer, containing a decorative sheet,
 (3) coating the microsphere containing epoxy composition at least 1 mil thick over the entire top of the decorative sheet, to provide an outer epoxy resin matrix containing supporting microspheres,
 (4) drying the coated decorative sheet,
 (5) placing the dried, coated, decorative sheet on a resin impregnated core, and
 (6) heat and pressure consolidating the decorative sheet and core, where said microspheres expand during steps (4) and (6), are substantially uniformly distributed through the epoxy resin matrix after step (6), and are effective to help support the coating of epoxy resin during consolidation.

7. The method of claim 6, where the decorative laminate contains a solid color decorative sheet.

8. The method of claim 6, where the core layer is impregnated with a phenolic resin, and aminotriazine-aldehyde resin is disposed between the phenolic resin and the epoxy resin.

9. The chemical resistant laminate of claim 1, where the microspheres are made from polyvinylidene chloride terpolymer.

10. A resin impregnated and resin coated, chemical resistant laminate comprising a core, and a top decorative layer containing a decorative sheet having a top exterior coating thereon, at least 1 mil thick and covering the entire decorative layer, the coating comprising a vinyl ester terminated bisphenol A epoxy resin matrix, containing hollow, transparent, microspheres made from a thermoplastic containing the

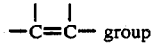 group and having a diameter of up to about 80 microns, said laminate being heat and pressure consolidated, where said microspheres comprise from about 1.5 volume % to about 20 volume % of the exterior coating, are substantially uniformly distributed through and support the epoxy resin matrix, and are effective to help support the epoxy resin coating during consolidation.

11. The chemical resistant laminate of claim 10, where the microspheres are made from polyvinylidene chloride terpolymer.

12. The method of claim 6, where the microspheres are made from polyvinylidene chloride terpolymer.

* * * * *